United States Patent
Okuno

(10) Patent No.: US 10,659,633 B2
(45) Date of Patent: May 19, 2020

(54) IMAGE PROCESSING DEVICE, METHOD OF CONTROLLING IMAGE PROCESSING DEVICE, NON-TRANSITORY COMPUTER READABLE RECORDING MEDIUM THEREFOR, AND IMAGE PROCESSING SYSTEM

(71) Applicant: BROTHER KOGYO KABUSHIKI KAISHA, Nagoya, Aichi (JP)

(72) Inventor: Tetsuya Okuno, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 16/171,551

(22) Filed: Oct. 26, 2018

(65) Prior Publication Data
US 2019/0132458 A1    May 2, 2019

(30) Foreign Application Priority Data
Oct. 30, 2017  (JP) .................. 2017-209680

(51) Int. Cl.
| H04N 1/00 | (2006.01) |
| G06F 3/0484 | (2013.01) |
| G06F 3/0488 | (2013.01) |

(52) U.S. Cl.
CPC ....... *H04N 1/00503* (2013.01); *G06F 3/0484* (2013.01); *H04N 1/00244* (2013.01); *H04N 1/00307* (2013.01); *H04N 1/00493* (2013.01); *H04N 1/00925* (2013.01); *H04N 1/00938* (2013.01); *G06F 3/0488* (2013.01); *H04N 2201/0075* (2013.01); *H04N 2201/0094* (2013.01)

(58) Field of Classification Search
USPC ....................................................... 358/1.15
See application file for complete search history.

(56) References Cited

U.S. PATENT DOCUMENTS

| 2006/0080184 A1* | 4/2006 | Zhang ............. G06Q 30/0283 705/26.1 |
| 2009/0210934 A1* | 8/2009 | Innes .................. G06F 21/305 726/7 |
| 2013/0257771 A1 | 10/2013 | Tomono |

(Continued)

FOREIGN PATENT DOCUMENTS

| JP | 2004-295325 A | 10/2004 |
| JP | 2013-214140 A | 10/2013 |

(Continued)

OTHER PUBLICATIONS

Wikipedia. Near-field communication; Aug. 5, 2005, Web Site: "https://en.wikipedia.org/w/index.php?title=Near-field_communication &oldid=20615003", all pages (Year: 2005).*

*Primary Examiner* — Helen Zong
(74) *Attorney, Agent, or Firm* — Scully Scott Murphy and Presser

(57) ABSTRACT

An image processing device is provided with a user interface, a wireless communication interface and a controller. The controller is configured to transmit UI information via the wireless communication interface to a mobile device, the UI information being to cause the mobile device to assume a function of the user interface, and lock the user interface when the UI information has been transmitted to the mobile device.

14 Claims, 10 Drawing Sheets

(56) References Cited

U.S. PATENT DOCUMENTS

2014/0168682 A1* 6/2014 Muto ................ H04N 1/00493
                                                358/1.13
2015/0181050 A1   6/2015 Nishii

FOREIGN PATENT DOCUMENTS

| JP | 2015-122014 A | 7/2015 | |
|---|---|---|---|
| JP | 2016-130916 A | 7/2016 | |
| JP | 2017-085419 A | 5/2017 | |
| JP | 2017-112558 A | 6/2017 | |
| WO | WO 2017/073008 A1 | 5/2017 | |
| WO | WO-2017073008 A1 * | 5/2017 | ........... G06F 3/1222 |

* cited by examiner

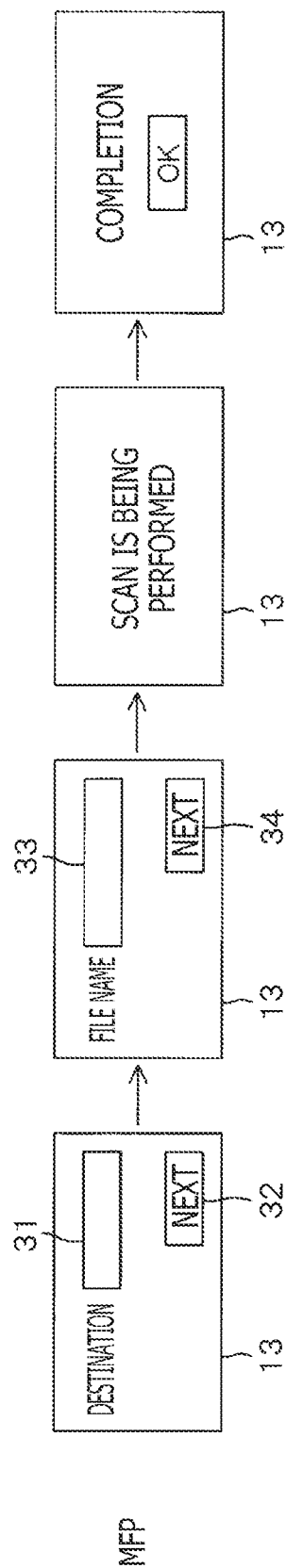

IMAGE PROCESSING DEVICE, METHOD OF CONTROLLING IMAGE PROCESSING DEVICE, NON-TRANSITORY COMPUTER READABLE RECORDING MEDIUM THEREFOR, AND IMAGE PROCESSING SYSTEM

CROSS-REFERENCE TO RELATED APPLICATIONS

This application claims priority under 35 U.S.C. § 119 from Japanese Patent Application No. 2017-209680 filed on Oct. 30, 2017. The entire subject matter of the application is incorporated herein by reference.

BACKGROUND

Technical Field

The present disclosures relate to an image processing device configured to execute a process using image data, a controlling method executed in such an image processing device, a non-transitory computer-readable recording medium storing instructions of controlling the image processing device, and an image processing system including the image processing device.

Related Art

As an image processing device, there has been known an MFP (multi-function peripheral) having a plurality of functions such as a printing function, a scanning function and a facsimile function as an example of an image processing device. The printing function is a function of printing an image represented by image data on a sheet such as a printing sheet. The scanning function is a function of reading an image on an original document and generate image data representing the read image. The facsimile function is to transmit/receive image data through a public telephone line.

SUMMARY

The MFP is generally provided with a UI (user interface). The UI is typically configured to include a displaying part which displays information and a receiving part which receives a user operation to input information. An example of the UI is a touch panel capable of displaying information and enabling the user to input information by touching operation of the touch panel. By monitoring the display of the UI and by operating the UI, the user can make (i.e., input) necessary settings for respective functions, for example, settings of the number of copies, print quality, a sheet size and the like.

Generally, a relatively small-sized UI is provided to the MFP in order to suppress a manufacturing cost. However, due to improvement and diversification of respective functions, the number of items to be set through the UI is increasing. Therefore, it becomes difficult to guarantee user-expected visibility and operability with the UI provided to the MFP.

There has been suggested a technique using a mobile terminal such as a smartphone of a user as the UI of the MFP so that various settings necessary for execution of respective functions of the MFP can be made through the mobile terminal. According to such a technique, the operability and visibility of the mobile terminal can be used as the UI of the MFP.

However, when a user uses the mobile terminal as the user interface for the MFP, if another user uses a user interface implemented to the MFP, processes regarding settings of the MFP may be confused therebetween.

According to aspects of the present disclosures, there is provided an image processing device, which is provided with a user interface, a wireless communication interface and a controller. The controller is configured to transmit UI information via the wireless communication interface to a mobile device, the UI information being to cause the mobile device to assume a function of the user interface, and lock the user interface when the controller transmits the UI information to the mobile device.

According to aspects of the present disclosures, there is provided a method of controlling an image processing device having an interface and a wireless communication interface configured to wirelessly communicate a mobile device. The method includes a UI information transmitting step of transmitting UI information via the wireless communication interface to the mobile device, the UI information being to cause the mobile device to assume a function of the user interface, and a UI locking step of locking the user interface when the UI information has been transmitted to the mobile device in the UI information transmitting step.

According to aspects of the present disclosures, there is provided a non-transitory computer-readable recording medium for an image processing device having an interface, a wireless communication interface and a controller. The recording medium contains instructions which cause, when executed by the controller, the image processing device to transmit UI information via the wireless communication interface to the mobile device, the UI information being used to cause the mobile device to assume a function of the user interface, and lock the user interface when the UI information has been transmitted to the mobile device.

According to aspects of the present disclosures, there is provided an image processing system including an image processing device, a mobile device and a server. The image processing device includes a user interface, a wireless communication interface and a controller. The controller is configured to receive first communication information transmitted by the server with the server communication interface in response to the user interface receiving an invoke instruction of an add-on program, transmit, after the first communication information is received, UI information via the wireless communication interface to the mobile device, the UI information being used to cause the mobile device to assume a function of the user interface, lock the user interface when the UI information has been transmitted to the mobile device, and receive, after the user interface is locked, with use of the wireless communication interface, second communication information transmitted from the mobile device and necessary to communicate with the server.

According to aspects of the present disclosures, there is provided an image processing device which is provided with a user interface, a wireless communication interface, and a controller. The controller is configured to cause the wireless communication interface to establish a wireless communication with the mobile device, transmit, in response to the causing the wireless communication interface to establish the wireless communication with the mobile device, UI information via the wireless communication interface to a mobile device, the UI information being to cause the mobile device to assume a function of the user interface, and lock the user interface in response to the causing the wireless communication interface to establish the wireless communication with the mobile device.

According to aspects of the present disclosures, there is provided image processing device which is provided with a user interface, a wireless communication interface and a controller. The controller is configured to cause the wireless communication interface to establish a wireless communication with the mobile device, transmit, in response to the causing the wireless communication interface to establish the wireless communication with the mobile device, UI information via the wireless communication interface to a mobile device, the UI information being to cause the mobile device to assume a function of the user interface, and lock the user interface in response to the transmitting the UI information to the mobile device.

BRIEF DESCRIPTION OF THE ACCOMPANYING DRAWINGS

FIG. 1 schematically shows a configuration of an image processing system according to a first embodiment of the present disclosures.

FIG. 4 shows examples of screens displayed on the operation panel of the MFP.

DETAILED DESCRIPTION OF THE EMBODIMENTS

Hereinafter, referring to the accompanying drawings, embodiments according to the present disclosures will be described.

<Image Processing System>

Figure 1:
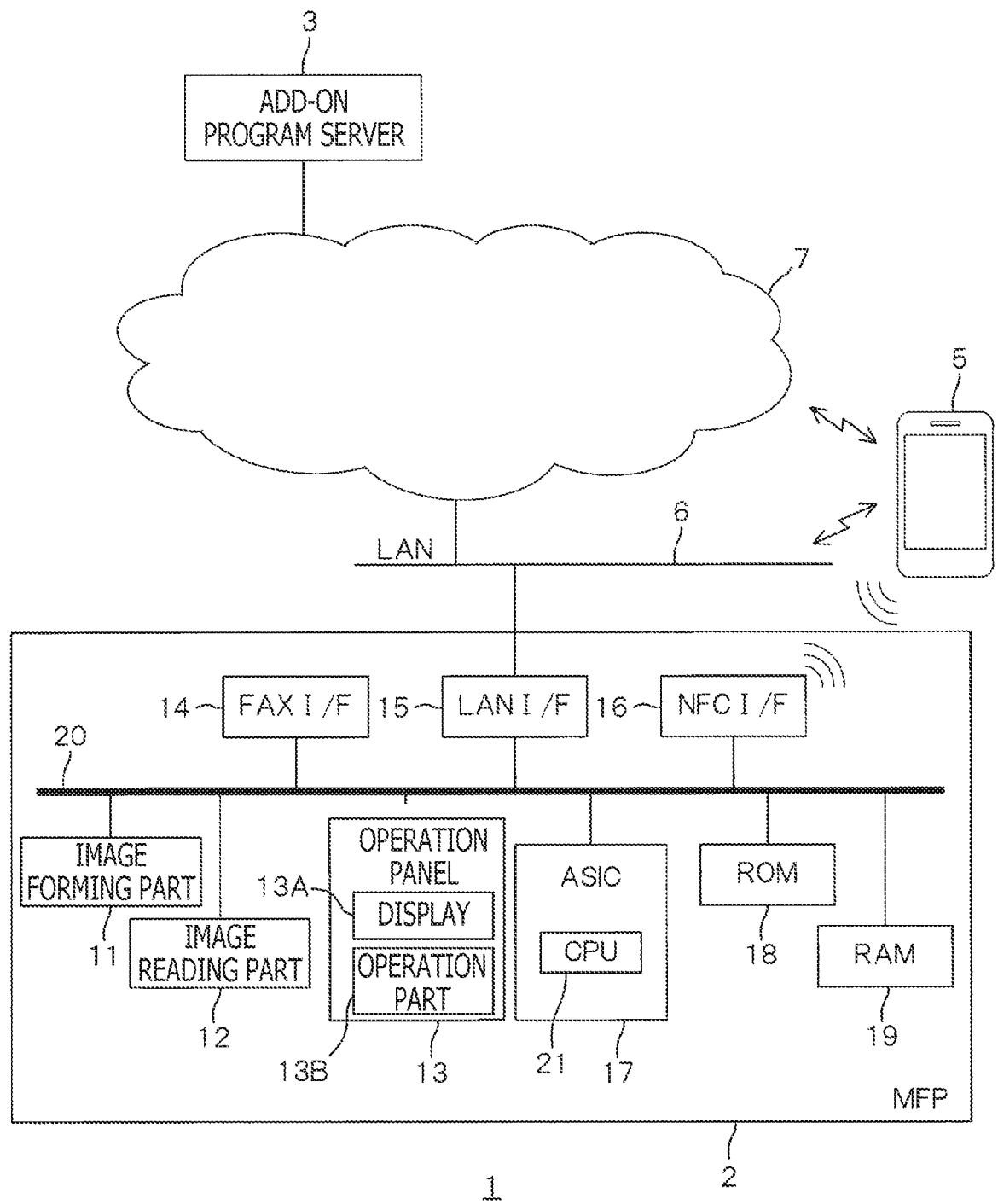

An image processing system 1 shown in FIG. 1 includes an MFP 2, an add-on program server 3, an input-candidate DB server 4 and a mobile terminal 5 (which is an example of a mobile device). The image processing system 1 is configured such that a function is realized by an add-on program with use of the MFP 2, which is an example of an image processing device.

It is noted that the add-on program is a program which adds on (i.e., enhances) standard functions of an image forming device (e.g., the MFP 2). There are two types of add-on programs, which are a built-in type add-on program and a web type add-on program. The built-in add-on program is used by installing the same, for example, in the MFP 2. The web type add-on program is executed as a server (e.g., the program server 3) and the image forming device cooperate with each other. That is, when the web type add-on program is executed, the image forming device executes a process regarding the add-on program with sequentially receiving commands regarding the add-on program from the server. According to the present disclosures, the add-on program may be either of the above two types add-on programs, or a mixture of the two types of add-on programs.

The MFP 2 is installed at a place where a LAN 6 is configured, and is connected to the Internet 7 through the LAN 6. The LAN 6 may include a wired LAN, but the LAN 6 includes a WLAN (wireless LAN) using "IEEE 802.11" is one of IEEE standards. The add-on program server 3 and the input-candidate DB server 4 exist on the Internet 7. The mobile terminal 5 has a function of performing WLAN communication, and is configured to connect with the Internet 7 through the LAN 6. The mobile terminal 5 also has a function of performing a mobile data communication, and is connectable with the Internet 7 through a mobile data communication line.

<MFP>

The MFP 2 is an electronic device having multiple functions such as a facsimile function, a printing function, a scanning function and a copying function. The facsimile function is to transmit/receive image data through a public telephone line. The printing function (an example of an image forming function) is a function of printing an image represented by image data on a sheet such as a printing sheet. The scanning function (which is an example of an image reading function) is a function of reading an image on an original document and generate image data representing the read image.

The MFP 2 is provided with an image forming part 11, an image reading part 12, an operation panel 13, a facsimile interface (FAX I/F) 14, a LAN I/F 15, an NFC (near field communication) I/F 15, an ASIC (application specific integrated circuit) I/F 16, an ASIC 17, a ROM 18 (e.g., a rewritable non-volatile memory such as a flash memory), and a RAM 19 (e.g., volatile memory such as a DRAM), which are interconnected though a bus 20 so as to be perform data communication with each other.

The image forming part 11 is configured to form a color image or a monochromatic (e.g., black-and-white) image on a sheet (e.g., a printing sheet) which is conveyed along a sheet conveying passage one by one. It is noted that a method of image formation may be an electrophotographic imaging method or an inkjet method.

The image reading part 12 is configured to read an image formed on the sheet and generates image data representing the read image. It is noted that a reading method may be a CIS (contact image sensor) method, or a CCD (charge coupled device).

The operation panel 13 (which is an example of a UI) includes a touch panel, which is configured such that, an operation part 13B (which is an example of a receiving part) such as a pressure sensitive type or electrostatic capacitance type transparent film switch is overlaid on a display part 13A (e.g., a liquid crystal display). When a user touches an operation button displayed on the operation panel, an instruction corresponding to the touched button is received by the operation panel 13. When the instruction is received by the operation panel 13, a signal corresponding to a content of the instruction is transmitted from the operation panel 13 to the ASIC 17.

The FAX I/F 14 is an interface for connection with a public telephone network used for the facsimile communication, and is provided with a MODEM having a built-in NCU (network control unit).

The LAN interface 15 (which is an example of a server communication part) is an interface to connect with the LAN 6.

The NFC interface 16 (which is an example of a wireless communication part, a near field communication part) is an interface for the wireless communication in accordance with the NFC. The NFC is a wireless communication technique corresponding to International standards ISO/IEC14443 and ISO/IEC18092, and using a 13.56 MHz band communication frequency. The NFC I/F 16 has a touch part. A device of an IC card having the NFC communication function is closely located or contacted to the touch part in order to execute the NFC communication. Specifically, when the device having the NFC wireless communication function is located within a particular distance area with respect to the touch part, the NFC communication is established between the device and the NFC interface 16, and it becomes possible to start the data communication therebetween.

In the following description, when it is described that a wireless communication device having the NFC communication function is brought to touch with the NFC I/F 16 to establish the NFC communication, it also includes a case where the wireless communication device having the NFC communication function does not actually touch but is located sufficiently close to the NFC I/F 16 so that the NFC communication can be established.

The ASIC 17 includes a CPU 21 (which is an example of a controller). The CPU 21 controls respective components such as the image forming part 11, the image reading part 12, the operation panel 13, the FAX I/F 14, the LAN I/F 15 and the NFC I/F 16 by executing programs for respective processes based in information input to the ASIC 17.

The ROM 18 stores programs to be executed by the CPU 21 and various pieces of data.

The RAM 19 is used as a work area when the CPU 21 executes respective programs.

<Add-On Program Server>

The add-on program server 3 is a server configured to supply functions to the MFP 2 with use of add-on programs. The add-on program server 3 stores add-on programs. As the add-on programs are executed, functions corresponding to the add-on programs are supplied to the MFP 2. Examples of the functions which can be supplied to the MFP 2 by executing the add-on programs include a scan-mail function of attaching image data created by the image reading part 12 to email and transmitting the same from the MFP 2, a scan-upload function of uploading image data, which has been read by the image reading part 12, from the MFP 2 to the add-on program server 3 on the Internet, and a download-print function of downloading the image data from the add-on program server 3 on the Internet to the MFP 2 and print the image data downloaded from the download sever 3.

<Mobile Terminal>

The mobile terminal 5 is a portable terminal device provided with a touch panel (e.g., a smartphone, a tablet). The mobile terminal 5 has the NFC wireless communication function in addition with the WLAN communication function and the mobile data communication function mentioned above. Therefore, when the mobile terminal 5 is located within a particular distance range with respect to the NFC interface 16 of the MFP 2, the NFC communication is established between the mobile terminal 5 and the NFC interface 16, thereby data communication therebetween being executable.

First Embodiment

<Add-on Program>

Figure 2A:
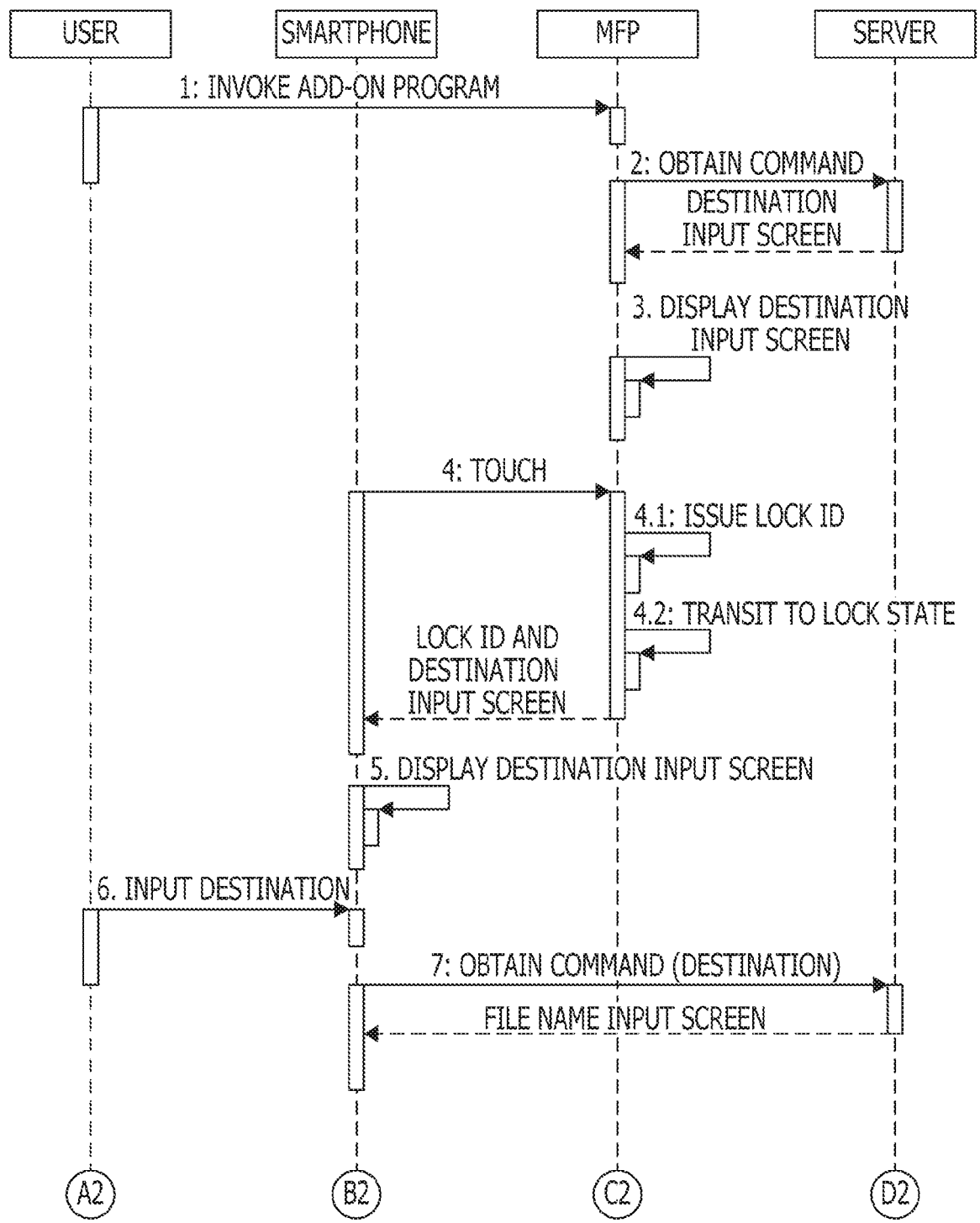
FIGS. 2A and 2B show a sequence chart which is executed when a function realized by an add-on program is used.

As shown in FIG. 2A, the add-on program is invoked by the user (1: INVOKE ADD-ON PROGRAM). For example, on a menu screen displayed on the operation panel 13 of the MFP 2, a button instructing to invoke an add-on program is include. As the user depresses the bottom, the instruction to invoke the add-on program is received by the operation panel 13.

In the following description, a case where invocation of the add-on program of the scan-upload function is instructed will be described.

In response to the instruction of invoking the add-on program is received by the operation panel 13, the CPU 21 of the MFP 2 retrieves "URL1" stored in the ROM 18 to obtain a command from the add-on program sever 3, and accesses a file in the add-on program server 3 identified by the retrieved "URL1" (2: OBTAIN COMMAND).

In response to this access to the file described above, a destination input screen display command is transmitted from the add-on program server 3 to the MFP 2.

The destination input screen display command is a document (file) described in an XML (Extended Markup Language). The destination input screen display command is configured such that an "XML declaration" is describe in a top line of the command, followed by a body of the XML document. In the XML document, it is instructed that a letter string "DESTINATION", a text input box in which the destination is to be input and a "NEXT" button are displayed on the destination input screen, which is a UI screen. Further, in the body of the XML document, "URL2", which is a next access destination, is designated.

Figure 3A:
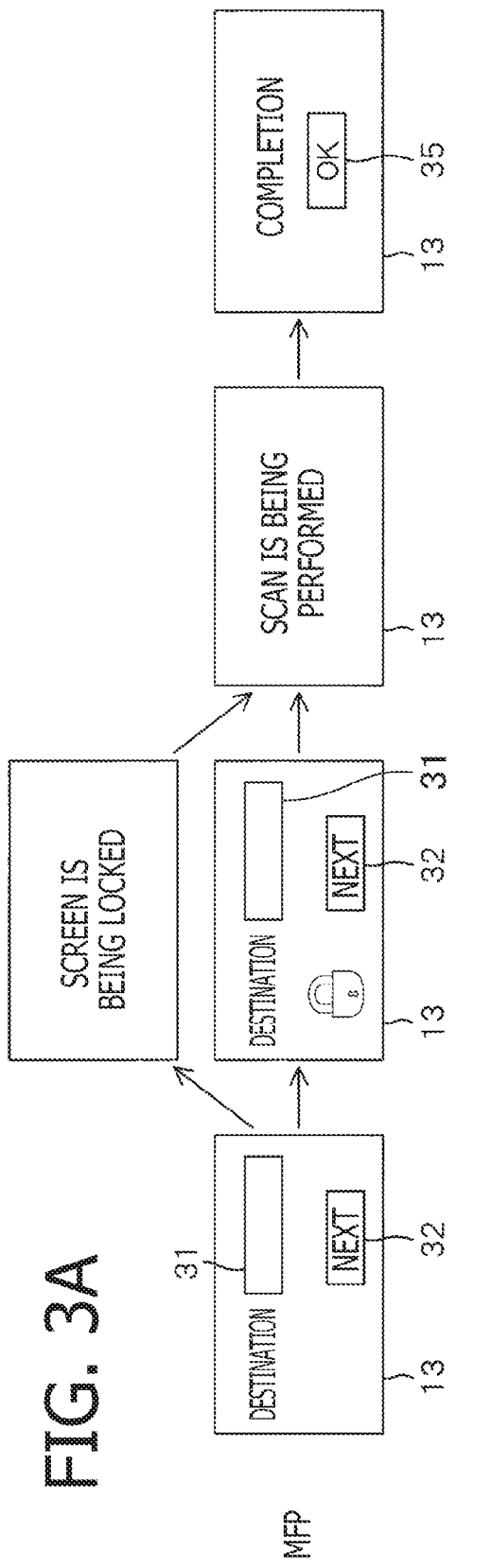
FIG. 3A shows examples of screens displayed on an operation panel of an MFP.

When the destination input screen display command is received from the add-on program server 3, the CPU 21 of the MFP 2 displays the destination input screen on the operation panel 13 (3: DISPLAY DESTINATION INPUT SCREEN). FIG. 3A shows an example of the destination input screen. As shown in FIG. 3A, on the destination input screen, a letter string "DESTINATION" is displayed, and the text input box 31 is displayed on a right side of the letter string "DESTINATION". Further, below a right end part of the text input box 31, the "NEXT" button 32 is displayed. It is noted that the operation panel 13 is an example of a user interface and the destination input screen is an example of a first object. It is also noted that the user interface may display another object together with the first object. The text input box is an example of a text input field.

It is noted that a key for inputting text in the text input box may be provided separately from the operation panel 13. Alternatively, the key for inputting text in the text input box may be a software keyboard displayed below the text input box 31.

Further, when the destination input screen display command is received form the add-on program server 3, the CPU 21 of the MFP 2 stores the destination input screen display command in the RAM 19.

After displaying the destination input screen, when the mobile terminal 5 is brought into touch with (or located closely to) the touch part of the NFC I/F 16 of the MFP 2 so that the NFC communication is established between the mobile terminal 5 and the NFC I/F 16 of the MFP 2 (4: TOUCH), the CPU 21 of the MFP 2 issues a lock ID (4.1: ISSUE LOCK ID). The lock ID is stored in the RAM 19. After issuance of the lock ID, the CPU 21 make a state of the operation panel 13 transit from a state where an operation of the operation part 13B can be received to a locked state where the operation of the operation part 13B is not received (4.2: TRANSIT TO LOCKED STATE). When the state of the operation panel 13 has been transited to the locked state, as shown in FIG. 3, a "lock" mark indicating the locked state is displayed on the destination input screen displayed on the operation panel 13, or a message indicating that the screen is locked is displayed on the operation panel 13. Thereafter, the CPU 21 controls the NFC I/F 16 to transmits the destination input screen display command and the lock ID to the mobile terminal 5 with use of the NFC communication.

It is noted that the locked state of the operation panel 13 may be a state where the operation part 13B does not receive any operation. Alternatively, the locked state may be a state where the operation part 13B does not receive operations which can be received through the destination input screen of the mobile terminal 5, but can receive any other operations. Further alternatively, the display of the operation panel 13 may be turned OFF (i.e., blacked out).

In the mobile terminal 5, in response to receipt of the destination input screen display command, a dedicated application software installed in the mobile terminal functions to interpret the destination input screen display command, thereby the destination input screen being displayed on the touch panel of the mobile terminal (5: DISPLAY DESTINATION INPUT SCREEN). That is, on the touch panel of the mobile terminal 5, a letter string "DESTINATION" is displayed, a text input box 41 is displayed on the right side of the box name (i.e., the letter string) and a "NEXT" button 42 is displayed below a right end part of the text input box 41 as in the destination input screen displayed on the operation panel 13 of the MFP 2 (see FIGS. 3A and 3B). Further, in the mobile terminal 5, the received lock ID is stored in the memory.

In the destination input screen, the user operates the touch panel of the mobile terminal 5 to input a destination of email used for the scan-mail function (6: INPUT DESTINATION). When the user completes inputting the destination and depresses the "NEXT" button 42, information of the destination input in the text input box 41 is transmitted to the access destination identified by "URL2" (7: OBTAIN COMMAND (DESTINATION)). It is noted that "URL2" is the address on the add-on program server 3.

In response to access to the add-on program server 3, the file name input screen display command is transmitted form the add-on program server 3 to the mobile terminal 5.

The file name input screen display command is provide as a document described in the XML, and the body of the XML document instructs to display a letter string "FILE NAME", a text input box for inputting the file name, and the "NEXT" button in the file name input screen which is the UI screen. Further, the body of the XML document also designates the next access destination "URL3".

Figure 2B:
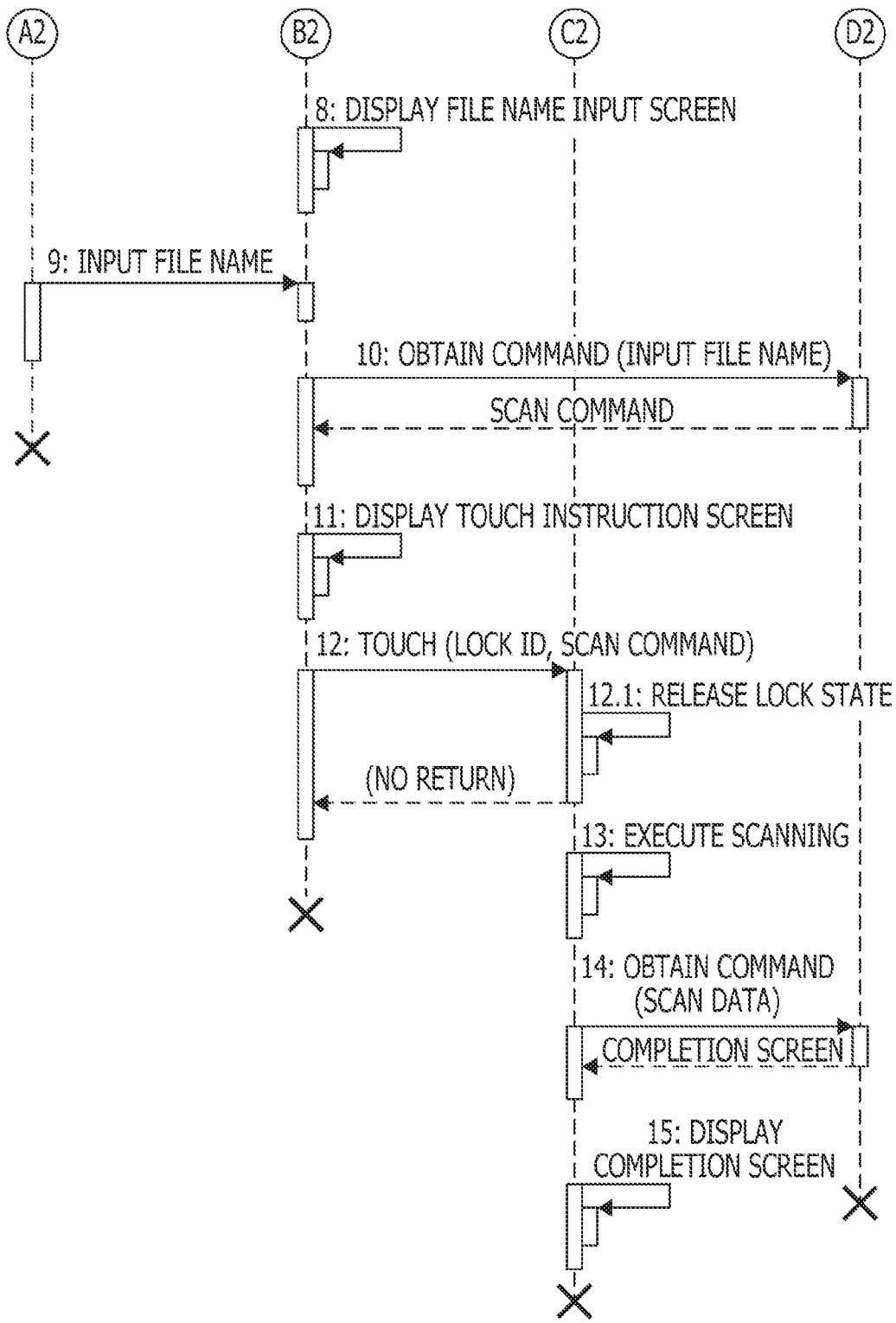

In the mobile terminal, in response to receipt of the file name input screen display command from the add-on program server 3, a file name input screen is displayed on the touch panel (8: DISPLAY FILE NAME INPUT SCREEN) as shown in FIG. 2B. In an example of the file name input screen, a letter string "FINE NAME" is displayed and a text input box 43 is displayed on the right side of the letter string "FILE NAME." Further, a "NEXT" button 44 is displayed below the right end part of the text input box 43.

In the file name input screen, the user operates the touch panel of the mobile terminal 5 to input a file name which is a name of a file to be transmitted by the scan-mail function in the text input box 43 (9: INPUT FILE NAME). When the user finished inputting the file name and depresses the "NEXT" button 44, information regarding the file name input in the text input box 43 is transmitted to an access destination which is identified by "URL3" (10: OBTAIN COMMAND (FILE NAM)). "ULD3" is an address on the add-on program server 3.

In response to the access by the mobile terminal 5, the add-on program server 3 transmits a scan command to the mobile terminal 5.

The scan command is for executing a scanning, that is, the scan command is a command instructing reading of an image with the image reading part 12. The scan command includes "URL4" indicating the next access destination. Since the mobile terminal 5 cannot process the scan command, when the mobile terminal 5 receives the scan command, the received scan command is stored in the memory and a touch instructing screen is displayed on the touch panel (11: DISPLAY TOUCH INSTRUCTING SCREEN). An example of the touch instructing screen is shown in FIG. 3. In this example, a message "PLEASE BRING PRESENT DEVICE IN TOUCH WITH MAIN BODY" is displayed.

After the touch instructing screen is displayed, when the mobile terminal 5 is brought into contact with the touch part of the NFC interface 16 of the MFP 2 and the NFC communication is established between the mobile terminal 5 and the NFC interface 16 of the MFP 2, the lock ID and the scan command stored in the memory of the mobile terminal 5 are transmitted to the MFP 2 by the NFC communication (12: TOUCH).

When receiving the lock ID and the scan command, the CPU 21 of the MFP 2 collates the received lock ID with the lock ID which was issued at a previous touching operation of the mobile terminal 5. When the two lock ID's coincide with each other, the CPU 21 makes state transition of the operation panel 13 from the locked state to a state where the operation paned 13B can receive the user operation. In other word, the CPU 12 releases the locked state of the operation panel 13 (12.1: RELEASE LOCKED STATE).

Thereafter, the CPU 12 controls the image reading part 12 to execute scanning of the image on the original with use of the scanning function (13: EXECUTE SCANNING). During execution of the scanning, a message, for example, indicating "SCAN IS BEING PERFORMED" on the operation panel 13 as show in FIG. 3A.

Upon completion of scanning, the CPU 21 of the MFP 2 transmits the image data created by executing the scanning (i.e., scan data) to the access destination identified by the "URL4" (14: OBTAIN COMMAND (SCAN DATA)).

When receiving the scan data, the add-on program server 3 uses the previously received input text as a file name and stores the received scan data in association with the file name. Then, the add-on program server 3 attach the scan data having the file name to email and transmits the same to the destination previously received. According to the above, a process of the scan-mail function is completed. After completion of the email transmission, the add-on program server 3 transmits a completion screen display command to the MFP 2.

When receiving the completion screen display command from the add-on program server 3, the CPU 21 of the MFP 2 displays a completion screen on the operation panel 13 (15: DISPLAY COMPLETION SCREEN). On the completion screen, as shown in FIG. 3A, "COMPLETION" is displayed as a message, and an "OK" button 35 is displayed below the message "COMPLETION". When the user depresses the "OK" button 35, the screen displayed on the operation panel 13 is switched from the completion screen to the menu screen.

After the address input screen is displayed on the operation panel 13, and when the mobile terminal 5 is not brought into touch with the touch part of the NFC I/F 16 of the MFP 2 and the address is input in the text input box 31 of the address input screen and the "NEXT" button 32 is depressed, the file name input screen is displayed on the operation panel 13 as shown in FIG. 4. In an example of the file input screen a letter string "FILE NAME" is displayed, and a text box 33 is displayed on the right side of the letter string "FILE NAME" and a "NEXT" button 34 is displayed below a right end part of the text input box 33.

<Effects>

As described above, when the destination input screen file is transmitted from the NFC I/F 16 of the MFP 2 to the mobile terminal 5, the mobile terminal 5 assumes a function of the operation panel 13 and the screen normally displayed on the display part 13A of the operation panel 13 is displayed on the mobile terminal 5. Then, the operations normally received by the operation part 13A of the operation panel 13 can be received by the mobile terminal 5. Therefore, settings of various functions (e.g., setting of destinations to be used in the scan-mail function) can be set on the mobile terminal 5.

When the destination input screen file is transmitted from the NFC I/F 16 to the mobile terminal 5, the operation panel 13 is locked. Thus, when the mobile terminal 5 is serves as an operation panel instead of the operation panel 13 of the MFP 2, usage of the operation panel 13 is suppressed. As a result, it is possible to suppress confusion of processes regarding settings of the MFP 2.

When transmitting the destination input screen file, the CPU 21 of the MFP 2 issues a lock ID for the destination mobile terminal 5, and transmits the lock ID together with the destination input screen file. After the state of the operation panel 13 is changed to the locked state, when the mobile terminal 5 receives the lock ID which is the same as the lock ID the MFP 2 previously transmitted, the locked state of the operation panel 13 is released. Therefore, if a lock ID is transmitted from a mobile terminal which is different from the mobile terminal 5 for which the lock ID was issued to the MFP 2, the received lock ID does not coincide with the lock ID the MFP 2 previously received, the locked state of the operation panel 13 is not released. Therefore, a situation where the locked state of the operation panel 13 is released with use of a mobile terminal which is different from the mobile terminal 5 for which the lock ID was issued is suppressed.

Further, not only the condition regarding the ID described above, when the MFP 2 receives the scan command instructing execution of the scanning using the add-on program from the mobile terminal 5, the locked state of the operation panel 13 is released. Therefore, release of the locked state of the operation panel 13 in a state where it is possible that the operation panel 13 is operated before execution of the scanning can be further suppressed.

Further, when the mobile terminal 5 is brought into touch with the touch part of the NFC I/F 16 of the MFP 2, the lock ID and the scan command are transmitted from the mobile terminal 5 to the MFP 2. Therefore, any particular operations are not necessary other than the touching operation of the mobile terminal 5 in order to transmit the lock ID and the scan command. Such a configuration is very convenient to the user.

When the state of the operation panel 13 is changed to the locked state, a communication partner of the add-on program server 3 is take over from the MFP 2 to the mobile terminal 5. Then, until the locked state of the operation panel 13 is released, no communication is performed between the MFP 2 and the addition-program server 3. Accordingly, unnecessary communication between the MFP 2 and the add-on program server 3 can be suppressed, and load to the MFP 2 and the add-on program server 3 can be reduced.

Second Embodiment

Figure 5A:
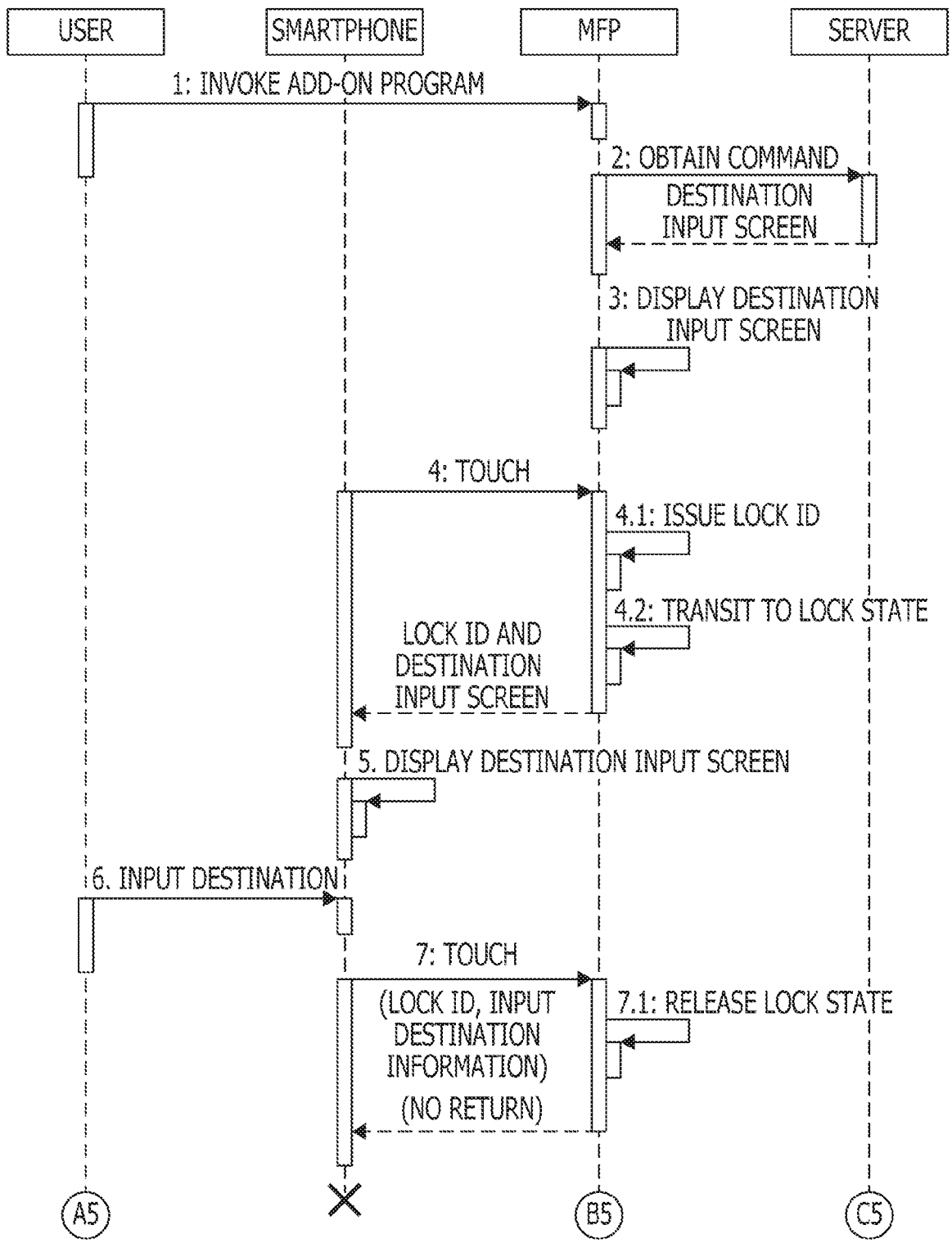
FIGS. 5A and 5B show a modified sequence chart which is executed when a function realized by an add-on program is used.
Figure 5B:
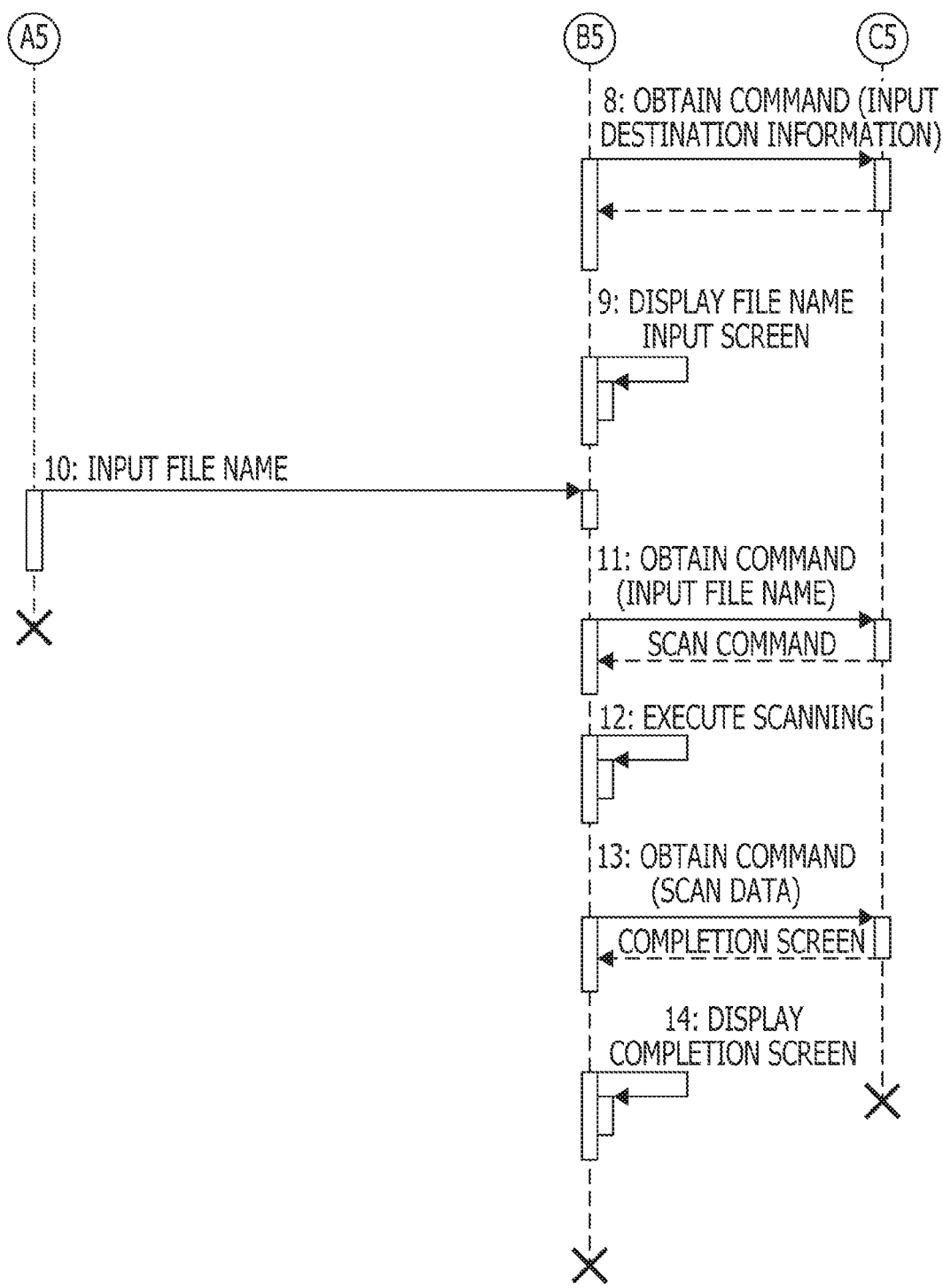

It is noted that a process shown in FIGS. 5A and 5B may be executed instead of the process shown in FIGS. 2A and 2B.

When the invocation instruction of the add-on program is received by the operation panel 13 (1: INVOKE ADD-ON PROGRAM), the CPU 21 of the MFP 2 retrieves the address "URL1" from the ROM 18 and controls the LAN I/F 15 to access a file identified by the "URL1" which is stored in the add-on program server 3 to obtain the command from the add-on program server 3 as shown in FIG. 5A (2: OBTAIN COMMAND).

In response to the access as described above, the destination input screen display command is transmitted from the add-on program server 3 to the MFP 2. The content of the destination input screen display command is the same as the content shown in FIGS. 2A and 2B, and the destination input screen display command includes "URL2" which indicates the next access destination.

When receiving the destination input screen display command from the add-on program server 3, the CPU 21 of the MFP 2 displays the destination input screen (see FIG. 3A) on the operation panel 13 (3: DISPLAY DESTINATION INPUT SCREEN).

Further, when receiving the destination input screen command from the addition-program server 3, the CPU 21 of the MFP 2 creates an HTML document including the content of the destination input screen display command using the XSLT which is an XML document conversion language. Then, the CPU 21 stores the destination input screen file, which is the HTML document, in the RAM 19.

After displaying the destination input screen, when the mobile terminal 5 is brought into touch with the NFC I/F 16 and the NFC communication between the mobile terminal 5 and the NFC I/F 16 of the NFC 2 is established (4: TOUCH), the CPU 21 of the MFP 2 issues a lock ID (4.1: ISSUE LOCK ID). The lock ID is stored in the RAM 19. After issuance of the lock ID, the CPU 21 changes the state of the operation panel from a state where the operation panel 13 can received the user's operation of the operation part 13B to the locked state in which the user's operation of the operation part 13B is not received (4.2: TRANSIT TO LOCKED STATE). Thereafter, the CPU 21 controls the NFC I/F 16 to transmit, by the NFC communication, the destination input screen file and the lock ID to the mobile terminal 5.

In response to receipt of the destination input screen file, in the mobile terminal 5, a standard browser of an operating system of the mobile terminal 5 or a browser additionally installed in the mobile terminal 5 is invoked with the function of a dedicated application software installed in the mobile terminal 5. Then, on the browser, the content (image) of the destination input screen file is displayed (5: DISPLAY DESTINATION INPUT SCREEN).

The user operates the touch panel on the mobile terminal 5 to input the destination of email, which is sent by the scan-mail function, in the text input box 41 on the destination input screen (6: INPUT DESTINATION). When input of the destination is completed and the user depresses the "NEXT" button 42, the destination input in the text input box 41 is fixed. After depressing the "NEXT" button 42, the user brings the mobile terminal 5 into touch with the NFC I/F 16 of the MFP 2. With this touching operation, the NFC communication is established between the mobile terminal 5 and the NFC I/F 16 of the MFP 2, and the destination information input in the text input box 41 and the lock ID are transmitted from the mobile terminal 5 to the MFP 2 by the NFC communication.

When receiving the destination information and the lock ID, the CPU 21 of the MFP 2 collates the received lock ID with the lock ID which was issued when the touching operation of the mobile terminal 5 was performed. When the received lock ID and the lock ID issued when the touching operation was performed coincide with each other, the CPU 21 changes the state of the operation panel 13 from the locked state to a state where the operation panel 13 can receive the user's operation of the operation part 13B. That is, the locked state of the operation panel 13 is released (7.1: RELEASE LOCKED STATE).

Thereafter, the CPU 21 of the MFP 2 transmits the destination information received from the mobile terminal 5 to the access destination identified by the "URL2" included in the destination input and is retrieved stored in the RAM 19 (8: OBTAIN COMMAND (INPUT DESTINATION INFORMATION). The "URL2" indicates an address stored in the add-on program server 3.

In response to access to the add-on program server 3, the a name input screen display command is transmitted from the add-on program server 3 to the MFP 2. The content of the file name input screen display command is the same as the command in the process shown in FIGS. 2A and 2B, and the file name input screen display command includes the next access address "URL3".

When receiving the file name input screen display command from the add-on program server 3, the CPU 21 of the MFP 2 displays the file name input screen on the operation panel 13 (9: DISPLAY FILE NAME INPUT SCREEN). An example of the file name input screen is shown in FIG. 4.

The user can operate the operation panel 13, on the file name input screen, and input a file name of a file, which is transmitted by the scan-mail function, in the text input box 43 (10: INPUT FILE NAME). When the file name has been input and the user depresses the "NEXT" button 44, the CPU 21 of the MFP 2 transmits information of the file name input in the text input box 43 to the access destination identified by "URL3" (11: OBTAIN COMMAND (INPUT FILE NAME)). It is noted that "URL3" is the address in the add-on program server 3.

In response to access to the add-on program server 3, the scan command is transmitted from the add-on program server 3 to the MFP 2. It is noted that the scan command includes "URL4" which is a next access destination.

When receiving the scan command, the CPU 21 of the MFP 2 controls the image reading part 12 and executes scanning of an image on the original document with use of the scanning function (12: EXECUTE SCANNING).

When the scanning has been completed, the CPU 12 of the MFP 2 transmits the image data (i.e., scan data) created by scanning to the access destination identified by "URL4" (13: OBTAIN COMMAND (SCAN DATA)).

When receiving the scan data, the add-on program server 3 uses the previously input text as a file name of the scan data and stores the received scan data in association with the file name. Then, the add-on program server 3 attaches the scan data associated with the file name to email and sends the email to the previously received destination. Thus, the process according to the scan-mail function is completed. After transmitting the email, the add-on program server 3 transmits a completion screen display command to the MFP 2.

When receiving the completion screen display command from the add-on program server 3, the CPU 21 of the MFP 2 displays a completion screen on the operation panel 13 (14: DISPLAY COMPLETION SCREEN).

In the process shown in FIGS. 5A and 5B, the effects achieved by the process shown in FIGS. 2A and 2B can be achieved without a direct communication between the add-on program server 3 and the mobile terminal 5.

Third Embodiment

Figure 6A:
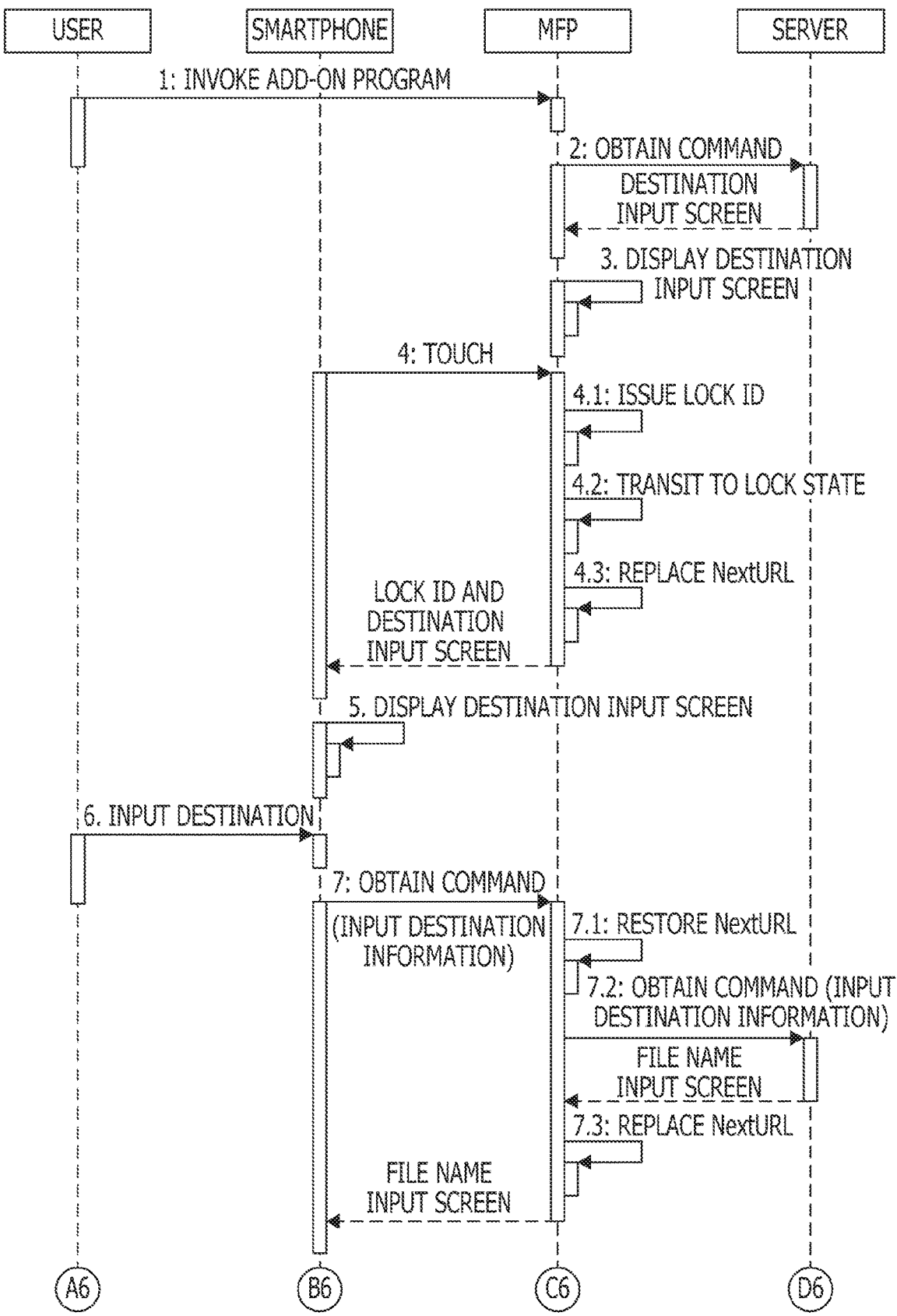
FIGS. 6A and 6B show a further modified sequence chart which is executed when a function realized by an add-on program is used.
Figure 6B:
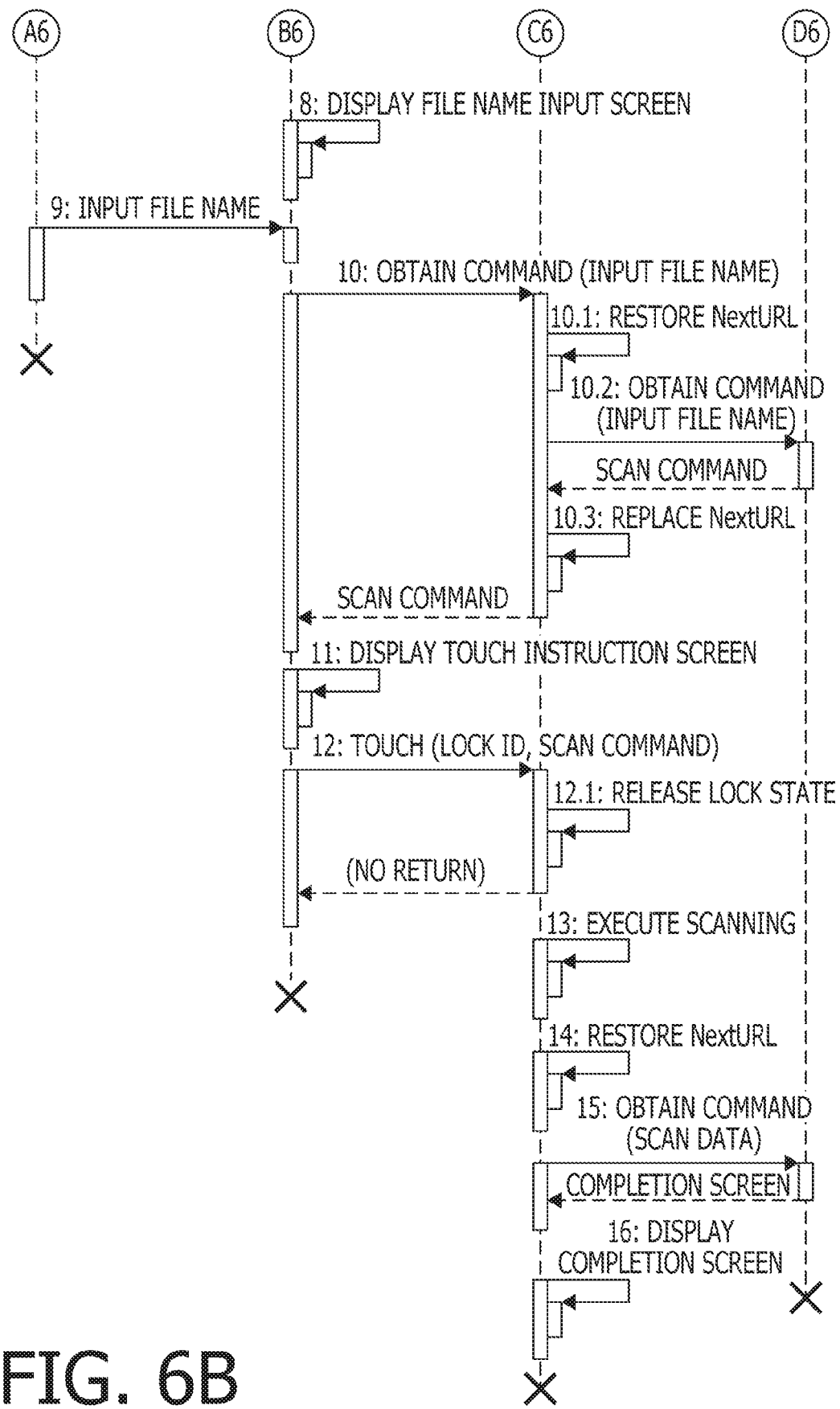

Instead of the process shown in FIGS. 2A and 2B, a process shown in FIGS. 6A and 6B may be executed.

In response to the operation panel 13 receiving the invocation instruction of an add-on program server 3 (1: INVOKE ADD-ON PROGRAM), the CPU 21 of the ASIC 17 of the MFP 2 retrieves "URL1" stored in the ROM 18 and controls the LAN I/F 15 to access a file in the add-on program server 3 identified by the "URL1" in order to obtain a command issued by the add-on program server 3, as shown in FIG. 6A (2: OBTAIN COMMAND).

In response to the access described above, the add-on program server 3 transmits a destination input display command to the MFP 2. The content of the destination input screen display command is the same as in the process shown in FIGS. 2A and 2B. The address input screen display command designates the next access destination "URL2".

When receiving the destination input screen display command from the add-on program server 3, the CPU 21 of the MFP 2 displays the destination input screen (see FIG. 3A) on the operation panel 13 (3: DISPLAY DESTINATION INPUT SCREEN).

Further, when receiving the destination input screen command from the addition-program server 3, the CPU 21 of the MFP 2 creates an HTML document including the content of the destination input screen display command using the XSLT which is an XML document conversion language. Then, the CPU 21 stores the destination input screen file, which is the HTML document, in the RAM 19.

After displaying the destination input screen, when the mobile terminal 5 is brought into touch with the NFC I/F 16 and the NFC communication between the mobile terminal 5 and the NFC I/F 16 of the NFC 2 is established (4: TOUCH), the CPU 21 of the MFP 2 issues a lock ID (4.1: ISSUE LOCK ID). The lock ID is stored in the RAM 19. After issuance of the lock ID, the CPU 21 changes the state of the operation panel from a state where the operation panel 13 can received the user's operation of the operation part 13B to the locked state in which the user's operation of the operation part 13B is not received (4.2: TRANSIT TO LOCKED STATE). Further, the CPU 21 replaces, in the destination input screen file, the next access destination "URL2" to "URL3" which is the address in the RAM 19 of the MFP 2 (4.3: NextURL REPLACEMENT). Thereafter, the CPU 21 controls the NFC OF 16 to transmit, by the NFC communication, the destination input screen file and the lock ID to the mobile terminal 5. Further, the CPU 21 stores "URL2" and "URL3" in the RAM 19 in an associated manner.

In response to receipt of the destination input screen file, in the mobile terminal 5, a standard browser of an operating system of the mobile terminal 5 or a browser additionally installed in the mobile terminal 5 is invoked with the function of a dedicated application software installed in the mobile terminal 5. Then, on the browser, the content (image) of the destination input screen file is displayed (5: DISPLAY DESTINATION INPUT SCREEN).

The user operates the touch panel on the mobile terminal 5 to input the destination of email, which is sent by the scan-mail function, in the text input box 41 on the destination input screen (6: INPUT DESTINATION). When input of the destination is completed and the user depresses the "NEXT" button 42, an HTTP message, which is input in the text input box 41 and represents information regarding the destination, is transmitted from the mobile terminal 5 to the access destination identified by "URL3" through the LAN 6 (7: OBTAIN COMMAND (INPUT DESTINATION). It is noted that the mobile terminal 5 is connected to the MFP 2 through the LAN 6 by its WLAN function such that data communication can be performed between the mobile terminal 5 and the MFP 2.

When receiving the information regarding the destination, the CPU 21 of the MFP 2 retrieves "URL2", which is associated with "URL3" and stored in the RAM 19, from the RAM 19 (7.1: RESTORE NextURL). Then, the CPU 21 transmits the information regarding the destination received from the mobile terminal 5 to the access destination identified by "URL2" included in the destination input screen file stored in the RAM 19 (7.2: OBTAIN COMMAND (INPUT DESTINATION INFORMATION). It is noted that "URL2" is an address in the add-on program server 3.

In response to the access to the add-on program server 3, an file name input screen display command is transmitted from the add-on program server 3 to the MFP 2. The content of the file name input screen display command is the same as in the process shown in FIGS. 2A and 2B. The file name input screen display command designates the next access destination "URL4".

Further, when receiving the file name input screen command from the addition-program server 3, the CPU 21 of the MFP 2 creates an HTML document including the content of the destination input screen display command using the XSLT which is an XML document conversion language. Then, the CPU 21 replaces "URL4" which is the next access destination with "URL5" which is an address in the RAM 19 of the MFP 2 (7.3: NextURL REPLACEMENT). Thereafter, the CPU 21 transmits the file name input screen file including "URL5" to the mobile terminal 5 through the LAN 6. Further, the CPU 21 stores "URL4" and "URL5" in the RAM 19 in an associated manner.

Figure 3B:
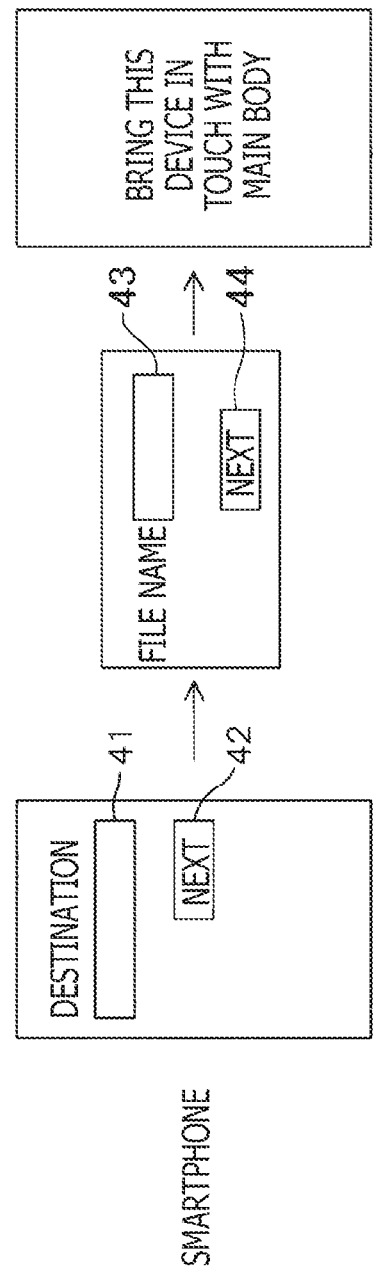
FIG. 3B shows examples of screens displayed on a mobile terminal.

When the mobile terminal 5 receives the file name input screen display command from the add-on program server 3, the mobile terminal 5 displays the file name input screen on the touch panel as shown in FIG. 6B (8: DISPLAY FILE NAME INPUT SCREEN). An example of the file name input screen is shown in FIG. 3B.

The user operates the touch panel of the mobile terminal 5 to input a file name which is the name of the file to be transmitted by the scan-mail function in the text input box 43 (9: INPUT FILE NAME). When the user has completed inputting the file name and depresses the "NEXT" button 44, information regarding the file name input in the text input box 43 is transmitted to an access destination which is identified by "URL5" (10: OBTAIN COMMAND (INPUT FILE NAME)).

When receiving information regarding the file name, the CPU 21 of the MFP 2 retrieves "URL4" stored in the RAM 19 with being associated with "URL5" from the RAM 19 (10.1: RESTORE NextURL). Then, the CPU 21 transmits the information regarding the file received from the mobile terminal to the access destination identified by "URL4" included in the destination input screen file stored in the RAM 19 (10.2: OBTAIN COMMAND (INPUT DESTINATION INFORMATION). It is noted that "URL4" is an address in the add-on program server 3.

In response to the access to the add-on program server 3, the scan command is transmitted from the add-on program server 3 to the mobile terminal 5. The scan command includes "URL6" which is the next access destination.

When receiving the scan command, the CPU 21 of the MFP 2 replaces "URL6" (the next access destination) of the received scan command with "URL7" which is the address of the RAM 19 of the MFP 2 (10.3: REPLACE NextURL). Thereafter, the CPU 21 transmits the scan command including "URL7" to the mobile terminal 5 through the LAN 6. Further, the CPU 21 associates "URL6" with "URL7" and stores the same in the RAM 19.

Since the mobile terminal 5 cannot process the scan command, when the mobile terminal 5 receives the scan command, the received scan command is stored in the memory and a touch instructing screen is displayed on the touch panel (11: DISPLAY TOUCH INSTRUCTING SCREEN). An example of the touch instructing screen is shown in FIG. 3.

After the touch instructing screen is displayed, when the mobile terminal 5 is brought into contact with the touch part of the NFC interface 16 of the MFP 2 and the NFC communication is established between the mobile terminal 5 and the NFC interface 16 of the MFP 2, the lock ID and the scan command stored in the memory of the mobile terminal 5 are transmitted to the MFP 2 by the NFC communication (12: TOUCH).

When receiving the lock ID and the scan command, the CPU 21 of the MFP 2 collates the received lock ID with the lock ID which was issued at a previous touching operation of the mobile terminal 5. When the two lock ID's coincide with each other, the CPU 21 makes state of the operation panel 13 from the locked state to a state where the operation panel 13B can receive the user operation. In other word, the CPU 12 releases the locked state of the operation panel 13 (12.1: RELEASE LOCKED STATE).

Thereafter, the CPU 12 controls the image reading part 12 to execute scanning of the image on the original with use of the scanning function (13: EXECUTE SCANNING).

Upon completion of scanning, the CPU 21 of the MFP 2 retrieves "URL6" which is stored in the RAM 19 in association with "URL7" included in the scan command (14: RESTORE NextURL).

Then, the CPU 21 transmits the image data (scan data) created by scanning to the access destination identified by "URL6" (15: OBTAIN COMMAND (SCAN DATA)).

When receiving the scan data, the add-on program server 3 uses the previously received input text as a file name and stores the received scan data in association with the file name. Then, the add-on program server 3 attach the scan data having the file name to email and transmits the same to the destination previously received. According to the above, a process of the scan-mail function is completed. After completion of the email transmission, the add-on program server 3 transmits a completion screen display command to the MFP 2.

When receiving the completion screen display command from the add-on program server 3, the CPU 21 of the MFP 2 displays a completion screen on the operation panel 13 (16: DISPLAY COMPLETION SCREEN).

In the process shown in FIGS. 6A and 6B, the effects achieved by the process shown in FIGS. 2A and 2B can be achieved without a direct communication between the add-on program server 3 and the mobile terminal 5.

Fourth Embodiment

In the process shown in FIGS. 6A and 6B, when the MFP 2 receives the scan command, the scan command is transmitted from the MFP 2 to the mobile terminal 5 through the LAN 6. It is noted that the process after the MFP 2 receives the scan command may be replaced with a process shown in FIG. 7.

Figure 7:
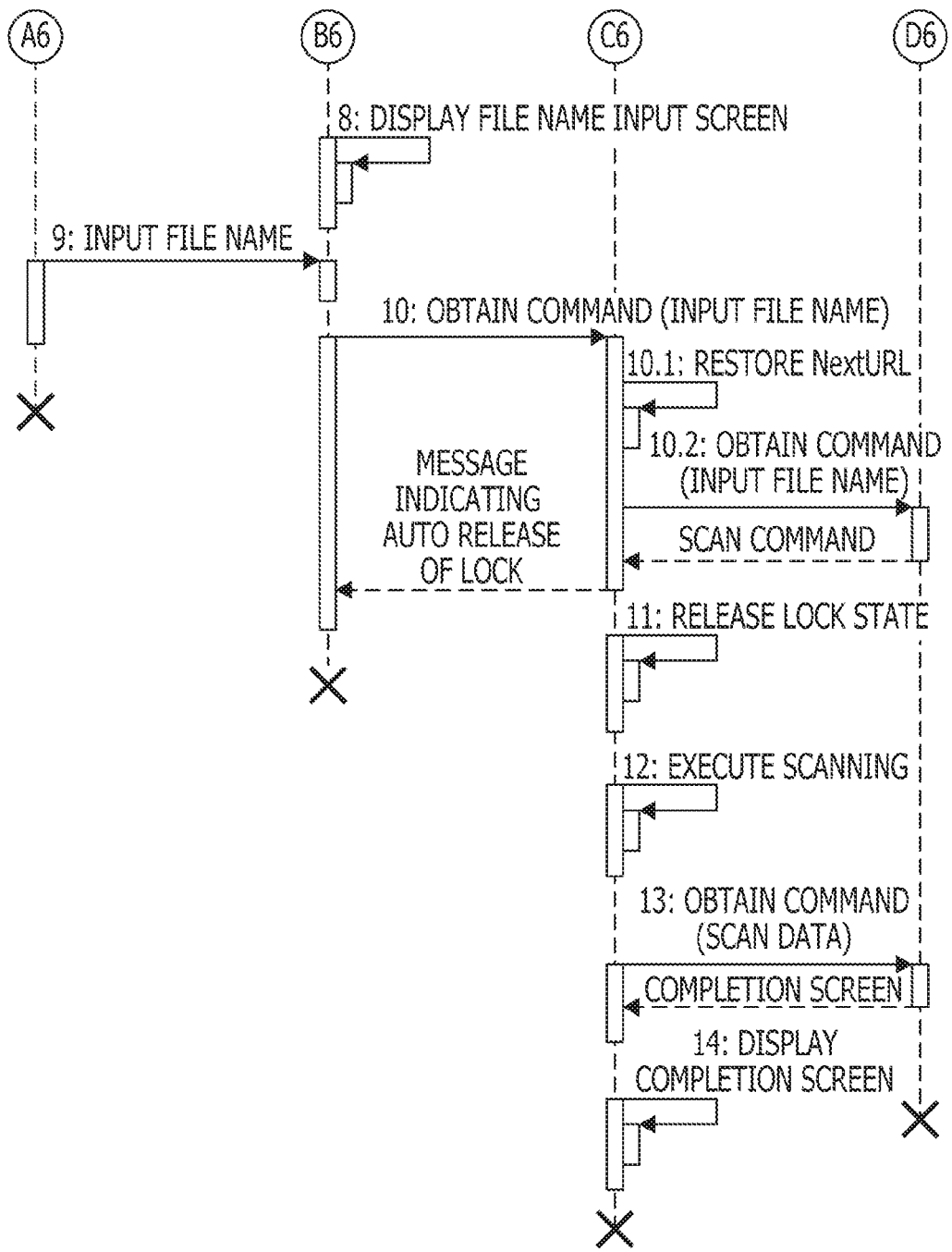
FIG. 7 is a part of furthermore modified sequence chart which is replaceable with FIG. 6B.

In the process shown in FIG. 7, when the CPU 21 of the MFP 2 receives the scan command from the add-on program server 3, a message indicating the locked state is automatically released to the mobile terminal 5. In response to receipt of this message, the mobile terminal 5 displays a message that the locked state of the operation panel 13 of the MFP 2 has been automatically released on the touch panel of the mobile terminal 5.

The CPU 21 makes state of the operation panel 13 from the locked state to a state where the operation panel 13B can receive the user operation. In other word, the CPU 12 releases the locked state of the operation panel 13 (11: RELEASE LOCKED STATE).

Thereafter, the CPU 21 of the MFP 2 controls the image reading part 12 and executes scanning of an image on the original document with use of the scanning function (12: EXECUTE SCANNING).

When the scanning has been completed, the CPU 12 of the MFP 2 transmits the image data (i.e., scan data) created by scanning to the access destination identified by "URL6" (13: OBTAIN COMMAND (SCAN DATA)).

When receiving the scan data, the add-on program server 3 uses the previously input text as a file name of the scan data and stores the received scan data in association with the file name. Then, the add-on program server 3 attaches the scan data associated with the file name to email and sends the email to the previously received destination. Thus, the process according to the scan-mail function is completed. After transmitting the email, the add-on program server 3 transmits a completion screen display command to the MFP 2.

When receiving the completion screen display command from the add-on program server 3, the CPU 21 of the MFP 2 displays a completion screen on the operation panel 13 (14: DISPLAY COMPLETION SCREEN).

When the process shown in FIG. 6B is replaced with the process shown in FIG. 7, the effects achieved by the process shown in FIGS. 2A and 2B can be achieved without a direct communication between the add-on program server 3 and the mobile terminal 5.

Further Modifications

In the description above, four embodiments are described. It should be noted that aspects of the present disclosures need not be limited to the above-described four embodiments. That is, various modifications can be made without departing from aspects of the present disclosures.

What is claimed is:

1. An image processing device, comprising:
a user interface configured to receive a user operation;
a wireless communication interface configured to communicate with a mobile device; and
a controller configured to:
transmit first information necessary to communicate with a server via the wireless communication interface to the mobile device;
transmit user interface (UI) information via the wireless communication interface to the mobile device, the UI information being to cause the mobile device to assume a function of the user interface;
change a state of the user interface from an unlocked state to a locked state, when the controller transmits the UI information to the mobile device, the unlocked state being a state where the user interface is configured to receive the user operation, and the locked state being a state where the user interface is configured to restrict the user operation;
receive, with use of the wireless communication interface, second communication information transmitted via the mobile device and necessary to communicate with the server;
transmit identification information to the mobile device via the wireless communication interface;
release the locked state of the user interface in response to at least one of:
receive, through the wireless communication interface, identification information same as the identification information transmitted; and
process execution information instructing execution of a process using identification information same as the identification information transmitted and using an add-on program.

2. The image processing device according to claim 1, wherein the controller is configured to display a first object by the user interface, the object including at least one of a text input field and a key, and
wherein the UI information is to cause the mobile device to display a second object, the second object corresponding to the first object.

3. The image processing device according to claim 1, wherein, when the controller transmits the UI information via the wireless communication interface to the mobile device, the controller transmits identification information to the mobile device which is a transmission destination of the UI information.

4. The image processing device according to claim 1, further comprising a server communication interface configured to communicate with the server,
wherein, when an invoke instruction of the add-on program by the user interface, the controller is configured to receive first communication information transmitted by the server before transmitting the UI information to the mobile device; and
wherein the receipt of the second communication information is based on the mobile device receiving the second communication information from the server in a communication based on the first communication information, and the mobile device transmits the second communication information to the controller through the wireless communication interface.

5. The image processing device according to claim 1, wherein the restriction of the user operation under the locked state comprises limiting operations that are receivable by the image processing device to exclude operations that are receivable by the mobile device.

6. The image processing device according to claim 1, wherein the wireless communication interface is a short range wireless communication interface configured to establish a short range wireless communication with the mobile device when a distance between the wireless communication interface and the mobile device is equal to or less than a particular distance, and
wherein the controller is configured to release the locked state of the user interface when the short range wireless communication has been established between the mobile device and the short range wireless communication interface and when the controller receives, through the wireless communication interface, identification information same as the identification information transmitted to the mobile device.

7. The image processing device according to claim 6, wherein the control does not release the locked state of the user interface when the short range wireless communication between the mobile device and the short range wireless communication interface is established but the controller does not receive, through the wireless communication interface, identification information the same as the identification information transmitted to the mobile device.

8. A method of controlling an image processing device having an interface and a wireless communication interface configured to wirelessly communicate a mobile device, the method comprising:
   transmitting first information necessary to communicate with a server via the wireless communication interface to the mobile device;
   transmitting UI information via the wireless communication interface to the mobile device, the UI information being to cause the mobile device to assume a function of the user interface;
   changing a state of the user interface from an unlocked state to a locked state, when the UI information has been transmitted to the mobile device, the unlocked state being a state where the user interface is configured to receive the user operation, and the locked state being a state where the user interface is configured to restrict the user operation;
   receiving, with use of the wireless communication interface, second communication information transmitted from the mobile device and necessary to communicate with the server;
   transmitting identification information to the mobile device via the wireless communication interface;
   releasing the locked state of the user interface in response to at least one of:
      process execution information instructing execution of a process using identification information same as the identification information transmitted and using an add-on program; and
      receiving, through the wireless communication interface, identification information same as the identification information transmitted.

9. The method according to claim 8, wherein the controller is configured to display a first object by the user interface, the object including at least one of a text input field and a key, and
wherein the UI information is to cause the mobile device to display a second object, the second object corresponding to the first object.

10. The method according to claim 8, wherein, when the UI information is transmitted to the mobile device via the wireless communication interface, the identification information is transmitted to the mobile device which is a transmission destination of the UI information.

11. The method according to claim 8, wherein the wireless communication interface is a short range wireless communication interface configured to establish a short range wireless communication with the mobile device when a distance between the wireless communication interface and the mobile device is equal to or less than a particular distance, and
the method further comprises releasing the locked state of the user interface when the short range wireless communication has been established between the mobile device and the short range wireless communication interface and when the controller receives, through the wireless communication interface, identification information same as the identification information transmitted to the mobile device.

12. The method according to claim 11, wherein the locked state of the user interface is not released when the short range wireless communication between the mobile device and the short range wireless communication interface is established but the controller does not receive, through the wireless communication interface, identification information the same as the identification information transmitted to the mobile device.

13. The method according to claim 8, wherein the image processing device includes a server communication interface configured to communicate with the server,
wherein, when an invoke instruction of the add-on program by the user interface, the method further comprises receiving first communication information transmitted by the server before transmitting the UI information to the mobile device; and
wherein receiving the second communication information is based on the mobile device receiving the second communication information from the server in a communication based on the first communication information, and transmitting, by the mobile device, the second communication information to the controller through the wireless communication interface.

14. An image processing system including an image processing device, a mobile device and a server,
wherein the image processing device comprising:
   a user interface;
   a wireless communication interface; and
   a controller,
wherein the controller is configured to:
receive first communication information transmitted by the server with the server communication interface in response to the user interface receiving an invoke instruction of an add-on program;
transmit, after the first communication information is received, UI information from the wireless communication interface to the mobile device, the UI information being used to cause the mobile device to assume a function of the user interface;
lock the user interface when the UI information has been transmitted to the mobile device; and
receive, after the user interface is locked, with use of the wireless communication interface, second communication information transmitted from the mobile device and necessary to communicate with the server.

* * * * *

UNITED STATES PATENT AND TRADEMARK OFFICE
CERTIFICATE OF CORRECTION

PATENT NO. : 10,659,633 B2  
APPLICATION NO. : 16/171551  
DATED : May 19, 2020  
INVENTOR(S) : Tetsuya Okuno Page 1 of 1

It is certified that error appears in the above-identified patent and that said Letters Patent is hereby corrected as shown below:

In the Claims

Column 18, Claim 11, Line 9 should read:
interface, and when the controller receives, through the Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*